(12) United States Patent
McGinley et al.

(10) Patent No.: US 7,910,834 B2
(45) Date of Patent: Mar. 22, 2011

(54) ENERGY SAVING CABLE ASSEMBLIES

(75) Inventors: Valerie McGinley, Barrington, IL (US); James W. McGinley, Barrington, IL (US); Donald Rimdzius, Addison, IL (US)

(73) Assignee: Voltstar Technologies, Inc., Schaumburg, IL (US)

( * ) Notice: Subject to any disclaimer, the term of this patent is extended or adjusted under 35 U.S.C. 154(b) by 255 days.

(21) Appl. No.: 12/176,261

(22) Filed: Jul. 18, 2008

(65) Prior Publication Data

US 2009/0294150 A1    Dec. 3, 2009

Related U.S. Application Data

(63) Continuation-in-part of application No. 12/127,592, filed on May 27, 2008.

(51) Int. Cl.
*H01B 7/00* (2006.01)
(52) U.S. Cl. .......................................... 174/112
(58) Field of Classification Search ............... 174/74 R, 174/78, 84 R
See application file for complete search history.

(56) References Cited

U.S. PATENT DOCUMENTS

| | | |
|---|---|---|
| 2,759,159 A | 8/1956 | Teetor |
| 2,907,855 A | 10/1959 | Hedges |
| 2,979,624 A | 4/1961 | Askerneese |
| 3,524,029 A | 8/1970 | Laff |
| 3,974,347 A * | 8/1976 | Lockard ................... 200/6 R |
| 4,323,762 A | 4/1982 | Ervin et al. |
| 4,463,228 A * | 7/1984 | Osika ........................... 200/51 R |
| 4,482,789 A | 11/1984 | McVey |
| 4,645,942 A | 2/1987 | Nilssen |
| 4,647,735 A | 3/1987 | Sicher |
| 5,070,219 A | 12/1991 | Grosskueger et al. |
| 5,081,627 A * | 1/1992 | Yu ................................... 714/46 |
| 5,181,902 A | 1/1993 | Erickson et al. |
| 5,193,665 A | 3/1993 | Jankow |

(Continued)

FOREIGN PATENT DOCUMENTS

JP    2000-102184 A    4/2000

(Continued)

OTHER PUBLICATIONS

Connor, Margery, "Tightened Power-Efficiency Regulations Force Power Supplies to Keep Up," EDN, Feb. 21, 2008, www. edn.com Internet publication (3 pages).

(Continued)

Primary Examiner — William H Mayo, III
(74) Attorney, Agent, or Firm — Greenberg Traurig LLP

(57) ABSTRACT

An embodiment of the present invention is direct to a cable assembly for use with any power cable for an electrical device. The cable assembly includes a remotely locatable switch for connecting or disconnecting the electrical device from power draw. Another embodiment of the present invention is directed to a cable assembly for a power device, such as a charger, for providing output power to an electronic device. The cable assembly includes two pairs of wires, wherein a first pair provides output power for the electronic device and a second pair includes a switch for turning off the charger. The cable assembly allows the switch to be located remotely from a charger housing for the converter circuitry and remotely from a power source such as an outlet, and allows the switch to be generally co-located with and operable at the connector for connecting the power device with the electronic device.

31 Claims, 7 Drawing Sheets

U.S. PATENT DOCUMENTS

| | | | |
|---|---|---|---|
| 5,220,152 A | 6/1993 | Doran | |
| 5,321,313 A | 6/1994 | Oberhauser | |
| 5,329,083 A | 7/1994 | Lai | |
| 5,338,218 A | 8/1994 | Haas | |
| 5,359,540 A | 10/1994 | Ortiz | |
| 5,408,059 A | 4/1995 | Goble | |
| 5,494,449 A | 2/1996 | Chioo | |
| 5,594,672 A | 1/1997 | Hicks | |
| 5,721,934 A | 2/1998 | Scheurich | |
| 5,734,206 A | 3/1998 | Keizer et al. | |
| 5,911,586 A | 6/1999 | Wintergerst | |
| 6,035,408 A | 3/2000 | Huang | |
| 6,134,612 A | 10/2000 | Bailey et al. | |
| 6,255,800 B1 | 7/2001 | Bork | |
| 6,272,030 B1 | 8/2001 | Oomura | |
| 6,461,117 B2 | 10/2002 | Thomas | |
| 6,461,176 B1 | 10/2002 | Haas | |
| 6,532,328 B1* | 3/2003 | Kline | 385/101 |
| 6,633,932 B1 | 10/2003 | Bork et al. | |
| 6,754,092 B2 | 6/2004 | McDowell et al. | |
| 6,774,603 B2 | 8/2004 | Liao | |
| 6,777,828 B1 | 8/2004 | Rothstein | |
| 6,790,093 B2 | 9/2004 | Tanaka et al. | |
| 6,825,427 B2* | 11/2004 | Jenks | 200/51.12 |
| 6,865,094 B2 | 3/2005 | Malik et al. | |
| 6,874,093 B2 | 3/2005 | Bell | |
| 6,895,516 B2 | 5/2005 | Odaohhara | |
| 7,049,937 B1* | 5/2006 | Zweig et al. | 340/310.11 |
| 7,101,226 B1 | 9/2006 | Gilliland | |
| 7,106,302 B2 | 9/2006 | Chen et al. | |
| 7,132,763 B2 | 11/2006 | Rendic | |
| 7,183,743 B2 | 2/2007 | Geiger | |
| 7,184,258 B2 | 2/2007 | Lai | |
| D543,147 S | 5/2007 | Ng | |
| 7,221,284 B2* | 5/2007 | Scherer et al. | 340/815.45 |
| 7,224,086 B2 | 5/2007 | Germagian et al. | |
| 7,516,343 B2 | 4/2009 | Bhogal et al. | |
| 7,544,909 B2* | 6/2009 | Dhir | 200/51.12 |
| 7,597,570 B2 | 10/2009 | So | |
| 7,635,273 B2 | 12/2009 | Buzil et al. | |
| 2006/0152867 A1 | 7/2006 | Bonasia et al. | |
| 2006/0194467 A1 | 8/2006 | Beasley et al. | |
| 2006/0278794 A1 | 12/2006 | Rast | |
| 2006/0292905 A1 | 12/2006 | Gilliland | |
| 2007/0141894 A1 | 6/2007 | McGinley et al. | |
| 2007/0164704 A1 | 7/2007 | McGinley et al. | |
| 2008/0054845 A1 | 3/2008 | Wang | |
| 2008/0170060 A1 | 7/2008 | Chen | |
| 2009/0295226 A1 | 12/2009 | Hodges | |
| 2010/0001684 A1 | 1/2010 | Eastlack | |
| 2010/0001685 A1 | 1/2010 | Eastlack | |
| 2010/0041262 A1 | 2/2010 | Chesneau | |

FOREIGN PATENT DOCUMENTS

| | | |
|---|---|---|
| JP | 2002-151221 | 5/2002 |
| JP | 2002-469544 A | 5/2002 |

OTHER PUBLICATIONS

Wallman, Dana, "Green Energy, A new charging solution conserves electricity by cutting off power to fully charged gadgets," Laptop Magazine, May 2008 (1 page).
ECNMag.com, "Brainstorm—Portable Power, Nov. 1, 2007," ECNMag, Nov. 1, 2007, www.ecnmag.com Internet publication (2 pages).
Lombardi, Candace, "Your cell phone is charged—please unplug," CNET News.com, Sep. 21, 2006, www.news.com Internet publication (3 pages).
Bombippy.com, "Is phantom load really a wall wart?", Nov. 15, 2007, www.bombippy.com Internet publication (3 pages).
Author unknown, "Phantom Load Killers," May 20, 2006, cbll.net Internet publication, http://cbll.net/weblog/post/index/279/Phantom-Load-Killers, (2 pages).
Alt, Marc, "The gadget guru," "clever strip," Mar. 2008, Domino Magazine, p. 48 (1 page).
Houghton, Stuart, "Nokia unveils eco-charger," Apr. 29, 2008, www.pocketpicks.com Internet publication (5 pages).
NokNok.tv, "Zero waste Nokia charger concept unveiled," Apr. 29, 2008, noknok.tv Internet publication (4 pages).
Yinli Electronic Industry Co. Ltd, "AC/DC Adapter," yinli.manufacturer.globalsources.com Internet publication (2 pages).
Zhejiang Lianlong Electron & Electric Appliances Co., Ltd., "500 mA Plug-in AC/DC Adapter," lianlong.manufacturer.globalsources.com Internet publication (2 pages).
TLC Direct, "13 Amp RCD Adaptor," www.tic-direct.co-uk Internet publication (2 pages).
Duronic, "3v 4.5v 6v 7.5v 9v 12v DC Regulated Power Supply 1200 mA," Amazon.com.uk Internet publication (7 pages).
Hama, "Universal 2.5A Stabilised Power Supply," Amazon.com.uk Internet publication (3 pages).
Greenplug, www.greenplug.us Internet publication (4 pages).
Vrej Barkhordarian, Power MOSFET Basics, International Rectifier, 13 pages, El Segundo, California.
NokNok.tv, NokNok—Tap into your Nokia's hidden talents, 4 pages, http://noknok.tv/news/zero-waste-nokia-charger-concept-unveiled/.
Green Plug, One Plug—One Planet, 2 pages, http://www.greenplug.us/oneplug.html.
amazon.co.uk, 3v 4.5v 6v 7.5v 9v 12 v DC Regulated Power Supply 1200mA, 2 pages, http://www.amazon.co.uk/4-5v-Regulated-Power-Supply.
de-direct.co.uk, 13 Amp RCD Adaptor part of RCD Plug-in Adaptors, 2 pages, BRJ03.
de-direct.co.uk, 13 Amp RCD Adaptor part of RCD Plug-in Adaptors, 2 pages, TLARCD.
www.youtube.com, Exclusive Nokia Zero Waste charger concept, 1 page, http://www.youtube.com/watch?v=JIXEv0jWR-8.

* cited by examiner

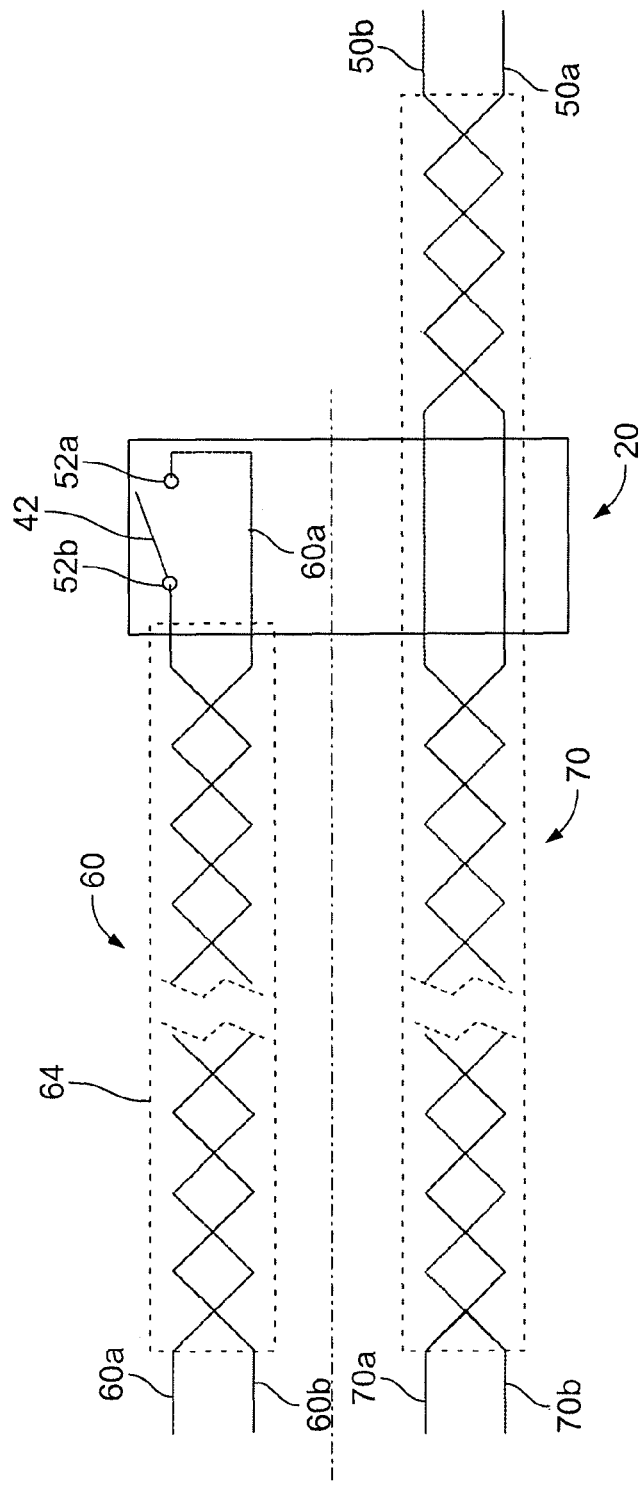
FIG. 4
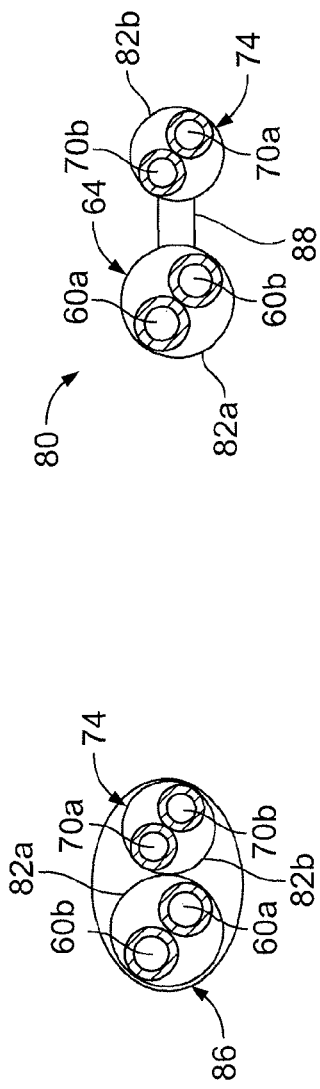
FIG. 5A
FIG. 5B

ENERGY SAVING CABLE ASSEMBLIES

CROSS-REFERENCE TO RELATED APPLICATION(S)

The present application is a continuation-in-part of U.S. Ser. No. 12/127,592, titled "Energy-Saving Power Adapter/Charger," and filed May 27, 2008.

FIELD OF THE INVENTION

The invention relates to power saving cables having a switch for reducing or eliminating power drain from idle or not-in-use electrical devices, such power drain commonly known as "phantom" load, including cables or cords adapted to be used in conjunction with a hardwired power cable provided for the electrical devices, and/or with a removable or detachable power cable provided for the device, the latter intended to include cables or cords for use in a power adaptor or charger, such as would be used for portable rechargeable electrical devices or information technology equipment including cellular telephones and the like, and the invention further relates to power adaptors or chargers for electrical devices, the chargers having a flexible cable with a switch therein for disconnecting the power to the charger to reduce or eliminate power drain commonly known as "phantom" load.

BACKGROUND

Currently, it is known to use power adapters and chargers for charging or powering a variety of electronic devices such as cellular telephones, so-call "smart phones" such as Blackberry devices provided by Research In Motion, Inc., personal data assistants, portable music or DVD players, and other similar devices. These devices typically include an on-board battery, and the chargers provide power to the battery. As used herein, the term "charger" refers to devices that provide a step in power (i.e., step power from an input voltage to an output voltage), convert power (i.e., convert input alternating current (AC) to output direct current (DC)) or both.

The charger generally has two connection points, a first one for receiving power and a second one for conveying power. The first connection point is generally prongs or blades that are inserted into a power outlet for receiving power therefrom which, in the United States, is alternating current power. The charger includes circuitry, generally disposed within a housing, for converting or adapting the input power received by the blades into output power delivered to the ITE device. For instance, the input power may be alternating current of a first voltage (such as 110/120V), and the output power may be direct current of a second, generally lower, voltage such as 5V.

The second connection point provides the output power to the ITE device. Generally speaking, for portable devices, the second connection point includes a connector that is removably connectable with the ITE device.

For most devices, the second connection point is remote from the first connection point. In other words, the charger has the blades connectable with the power outlet and mounted in the housing, the housing including the converter circuitry, and the charger has the connector and an electrical cord connecting the converter circuitry with the connector.

Such a configuration for the charger makes use thereof relatively simple. That is, a user may plug the charger blades into the power outlet of their choice (whether it is behind furniture or some other obstruction), and may leave the connector end in a place that is convenient for connecting and disconnecting the ITE device.

Despite this use being simple for a user, it has its own issues. In particular, the prior art chargers draw current at all times, regardless of being connected to the ITE device or not. This current or power draw is known as phantom load. To be more precise, phantom load is residual power consumption by power devices when not connected to their host electronic device, or when the electronic device is shut off.

Phantom load is becoming a greater issue for the public. Electrical devices that result in the described phantom load are continually increasing in per capita usage, populations increase exponentially, and great portions of the world's population are gaining the discretionary capital that enables the purchase of such devices. Energy is becoming more expensive on a monetary basis, and energy production overwhelmingly has an environmental impact, such as fossil fuel or nuclear energy.

Extensive effort has been and continues to be put into development of energy-efficient devices of all sorts. The "Energy Star" program sponsored by the United States Environmental Protection Agency and the United States Department of Energy is well known, though principally for energy efficiency appliances and building products such as glass doors and windows. In parallel with Energy Star standards efforts, a variety of state and federal laws have been enacted that are directed toward external power-supply products, which includes power devices or chargers for portable electronic devices. The most-recent standard for such portable devices is version 2.0 and is considered a push beyond simply forcing the industry to use power efficient components and layouts, requiring more complex power devices and supplies.

A recent development that arose during the preparation of the present application is a prototype device from Nokia that operates with a mechanical switch. Specifically, the Nokia device has a housing end receivable in a power receptacle and including internal circuitry for the charger/adapter functions. A button is located on the housing for turning the Nokia device on, and the circuitry automatically turns off by releasing the button.

While it is believed to have been developed after conception of the invention of present application, the Nokia device highlights some interesting points about efforts in this arena. For instance, the button of the Nokia device is a mechanical button and requires some type of mechanism for releasing the button for the "off" state. The button is also located on a housing for the internal circuitry that is separate from the electronic device connector, the connector being a two-terminal device (that is, having "+" and "−" terminals). The Nokia device also requires some type of mechanism for determining when the device should be shut down.

Most people do not bother to unplug a charger when the charged portable electronic device is removed therefrom. The Nokia device certainly relieves a user from such a burden in order to cut power, but it still requires the user to reach to wherever the device is received in a receptacle in order to turn on the device, such as behind a piece of furniture.

In order to be a true "zero-energy" device, the power input (i.e., AC input) to the power device itself must be cut. Therefore, the location within the circuit at which the power is cut is central. In other words, a switch that merely cuts the output power from the connector (such as might be used to prevent overcharging of a battery) while the converter/adapter circuitry remains under power is not a "zero-energy" device because the internal circuitry is allowed to draw power, the effect being no different than simply removing the electronic device itself. Towards this end, the Nokia device displays a uniform manner of thinking in the industry: a switch for connecting or disconnecting the AC power must be co-located with or closely proximate to the AC input such as the power prongs.

The switch/converter circuitry co-location paradigm demonstrates itself in industry practice and standards, particular as to how such relate to safety. As background, an isolation switch is one that cuts power to a portion of a device or circuit (more appropriately, sub-circuit) in a manner that is sufficient to allow a person to work on that portion of the device without a safety issue. An isolation switch is one that complete cuts power and voltage, etc., from a circuit so that there is zero risk of shock from contact with that circuit. A functional switch is one that, while cutting power, may still allow voltage to be present in a circuit and, thus, a shock may occur from a person coming into contact with the circuit.

A commonly used and well-known standards and approval organization is Underwriters Laboratories (UL), which has a UL 60950-1 standard for direct plug-in power supply (DPIU) devices that states, in section 3.4.5, "isolating switches shall not be fitted in flexible cords." More broadly, this standard says a "disconnect device shall be provided to disconnect the equipment from the mains supply for servicing," section 3.4.1, and such "disconnect devices . . . shall be connected as closely as practicable to the incoming supply." Furthermore, it is stated that "Functional switches are permitted to serve as disconnect devices provided that they comply with all the requirements for disconnect devices. However, these requirements do not apply to functional switches where other means of isolation are provided." Generally speaking, a switch for a charger (the switch connecting/disconnecting AC or converted DC power) in a cable may be considered a functional switch if the disconnect device is the AC plug for the charger.

Beyond portable electrical devices with removable power chargers for charging the battery thereof, there are many devices which draw a current regardless of their use. For instance, while some devices such as video cassette recorders (VCRs) typically include a clock, many people do not even bother to set said clock, let alone rely upon such as a timepiece.

Accordingly, it is desirable and there is a need for an improved power device, charger or otherwise, for reducing phantom load when a portable electrical device is disconnected from the power device or otherwise not intended to be drawing power from the power device. It is also desirable to provide a device that allows disconnection of power to an electrical device, the electrical device continuing to utilize its manufacturer-supplied power cord.

SUMMARY

In accordance with an aspect a cable assembly for use with a power cable of an electrical device is disclosed, the cable assembly including a first portion for connection with a power source, a second portion including a user-actuated switch, a cable extending between the first and second portions, and a third portion for electrical connection with the power cable of the electrical device, wherein the switch is operable for connection and disconnection of input power to the cable assembly with power to the electrical device connected with the cable assembly third portion.

In some forms, the first portion includes a plug having a plug body and a first and second side, the first side having prongs for electrical connection with the power source in the form of a power outlet, the second side having a secondary power outlet for receiving prongs of the electrical device power cable for delivering electrical power thereto. The switch may be secured with a portion of the power cable. The switch may be secured with a connector of the power cable, the connector for removably connecting the power cable with the electrical device.

In some forms, the switch is a two-position user-actuated switch. In some forms, the switch is user-actuated by a momentary connection across switch terminals thereof. The cable assembly may further include a timer, wherein actuation of the switch allows power to be provided to the third portion for a predetermined time, and the timer effects disconnection of the power after the predetermined time.

In some forms, the cable assembly further includes a current sense element, wherein the power in the cable assembly is disconnected when a current level through the current sense element is below a threshold level. A predetermined delay period may be provided, wherein the power in the cable assembly remains connected for the delay period subsequent to actuation of the switch.

In accordance with an additional aspect, a cable assembly for a power device having electrical circuitry for supplying output power to an electronic device comprising a first sub-cable including a switch and a pair of switch wires electrically connectable via the switch, a second sub-cable including a pair of output wires, each of the wires connected with output power from the power device and each of the output wires electrically connected with a connector for transmitting output power to the electronic device, wherein the switch is operable to open and close the electrical circuitry, the electrical circuitry drawing substantially no power when open.

In some forms, the first and second sub-cables are encased by a single jacket.

In some forms, the first and second sub-cables are joined by a bridge.

In some forms, the switch disconnects power from an input terminal of the power device electrically connected to a power source. The switch may disconnect the input terminal in the form of a plug prong of the power device from the power device electrical circuitry.

In some forms, the first and second sub-cables are substantially joined in parallel to extend a length from a housing of the power device in which the electrical circuitry is disposed to a switch assembly including the switch. The second sub-cable may extends from the switch assembly to the connector. The output wires may extend from the switch assembly to the connector.

In some forms, the switch is a functional switch.

In some forms, the switch is remotely located from the electrical circuitry.

In some forms, the power device is a step down AC to DC converter, and the switch cuts input AC power to the power device electrical circuitry.

In some forms, the switch is moveable between first and second positions corresponding to open and close the electrically circuitry.

In some forms, the cable assembly is elongated and flexible, the power device includes input prongs for receiving input power from a power source and includes a housing within which the electrical circuitry is generally disposed, and the switch is located remotely from the housing.

BRIEF DESCRIPTION OF THE DRAWINGS

In the Figures.

FIG. 4 is a representative diagram of the switch conductors, switch, and output conductors of FIG. 3;

FIGS. 5A and 5B are representative cross-sectional views of the cable assembly through the conductors showing the physical and electrical isolation thereof;

DETAILED DESCRIPTION

Figure 1:
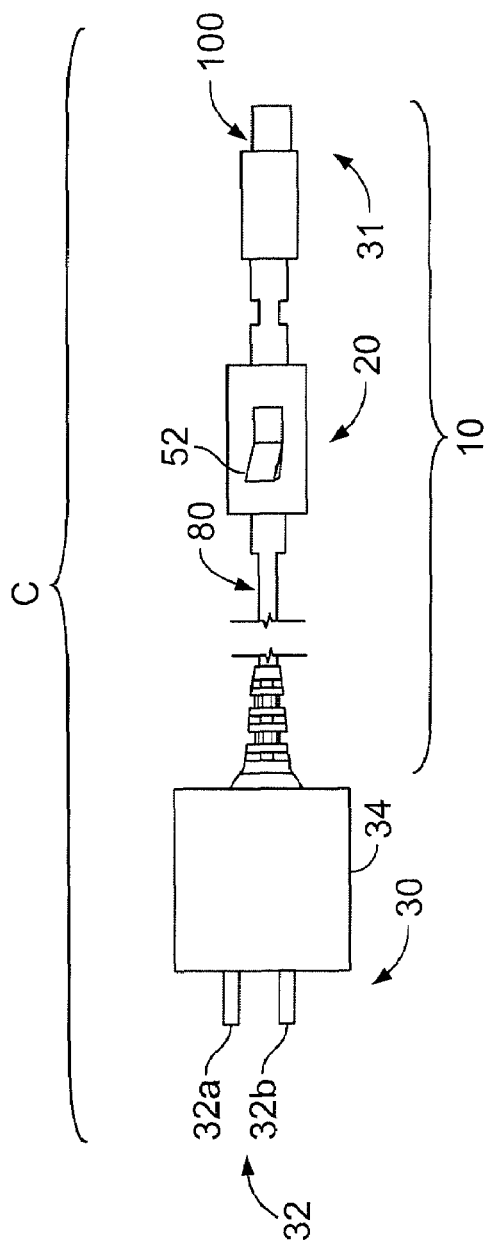
FIG. 1 is partial fragmentary view of a form of a cable assembly for use with a power charger, the cable assembly spanning between and electrically connected with an input for receiving power and with an output connector for transmitting power, the cable assembly including a switch assembly located remote or remotely from a housing, the housing including the charger circuitry for converting input power to output power, and the switch assembly being generally co-located with the output connector, the switch assembly allowing a user to open the charger circuit at the input power to reduce power draw to zero or negligible levels.
Figure 2:
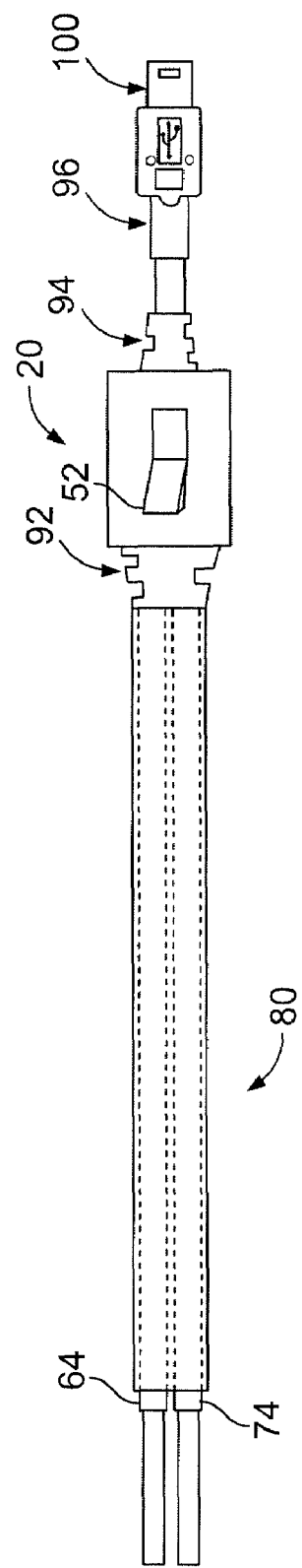
FIG. 2 is a fragmentary view of a portion of the charger of FIG. 1 showing the cable assembly.

Referring initially to FIGS. 1 and 2, a charger C having a cable assembly 10 is illustrated, the cable assembly 10 including a switch assembly 20 for disconnecting power to the charger C so that power or current draw by the charger C is zero or negligible. More specifically, as will be discussed below, the switch assembly 20 cuts power to internal circuitry of the charger C prior to the power conversion. The cable assembly 10 is generally elongated and flexible.

As can be seen, the charger C includes a first end 30 for connecting with a power source, generally a power outlet (not shown) supplying input power such as 120 VAC. The first end 30 includes at least a pair of blades or prongs 32 for insertion within the power outlet. The prongs 32 are mounted with a housing 34 in which electrical converter circuitry 36 is disposed. A first prong 32a is directly electrically connected with the circuitry 36, while a second switch prong 32b is electrically connected with the circuitry 36 through the switch assembly 20, as will be discussed in greater detail below. Accordingly, when the switch assembly 20 is in an open position, the switch prong 32b is electrically isolated and disconnected from the circuitry 36 so that the charger C itself is essentially open, and no power is drawn from the outlet.

Figure 3:
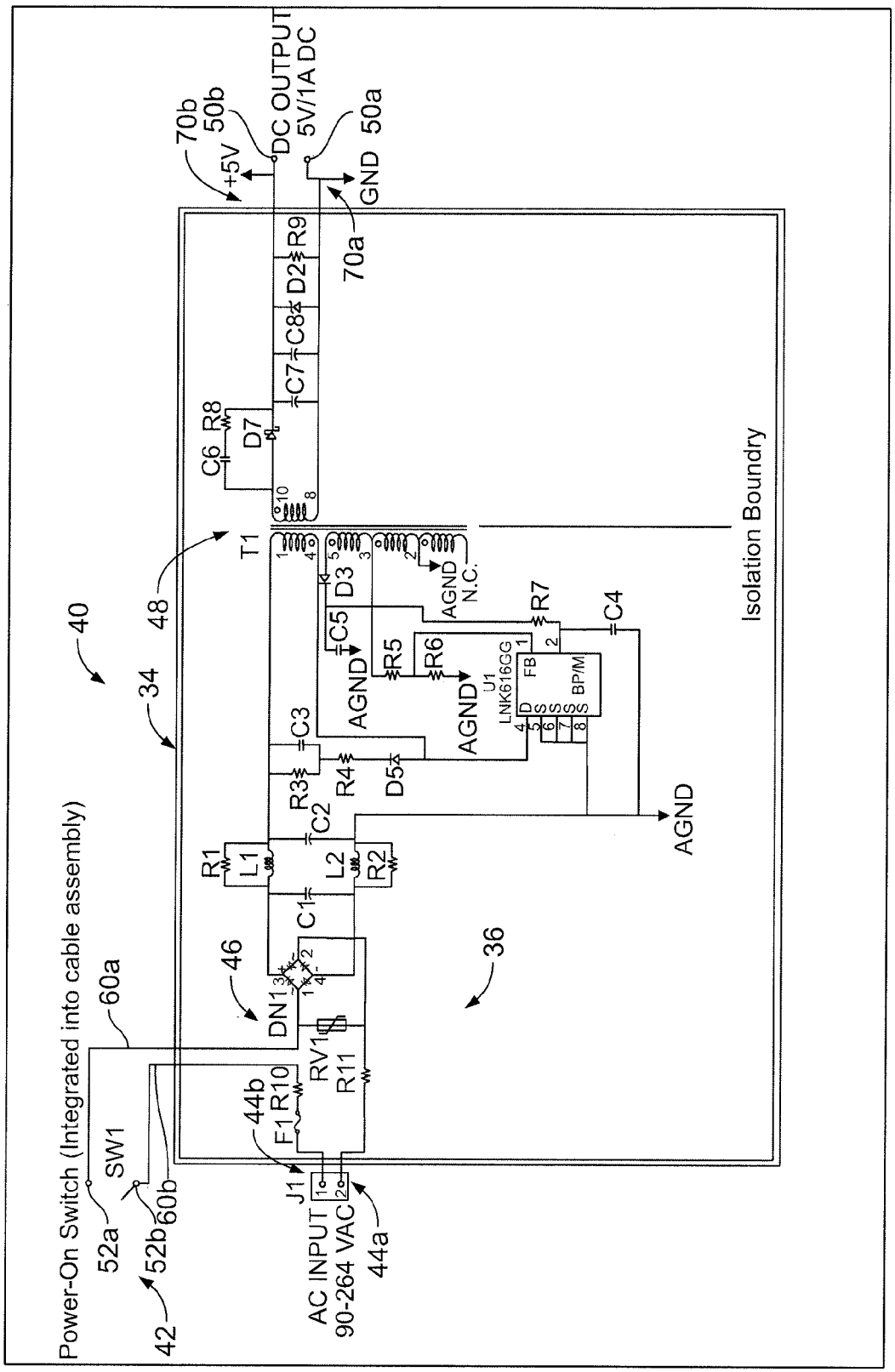
FIG. 3 is a representative circuit diagram showing the circuit of the charger of FIG. 1 having switch conductors electrically connectable through the switch assembly and output conductors or terminals for transmitting or delivering output power to an electrical device.

FIG. 3 illustrates a representative circuit 40 for the charger C incorporating a switch 42 within the switch assembly 20. As can be seen, the circuit 40 includes first and second inputs 44a and 44b corresponding to the prongs 32a and 32b, respectively. When the switch 42 is in the closed position, the circuit 40 receives input power (for the United States, typically 120 VAC) at the prongs 32a, 32b, transmits the power to a rectifying diode bridge 46 to convert the power to direct current (DC), further transmits the power to a transformer assembly 48 to step down the voltage (e.g., power at 5 VDC), and ultimately delivers the output power at output terminals 50a and 50b, which correspond to a second end 31 of the charger C.

With reference to FIGS. 1 and 3, the switch assembly 20 includes a simple single-throw switch having a toggle member 52 for connecting across switch terminals 52a and 52b (see FIG. 3). In the open position illustrated in FIGS. 3 and 4, the toggle member 52 is positioned so that that the terminals 52a and 52b are not electrically connected, and in the closed position the toggle member 52 is positioned to electrically connect the terminals 52a and 52b. In a preferred form, the switch assembly 20 and the toggle member 52 are rated for 120 to 240 VAC and 2.5 amps or greater.

With reference to FIG. 4, a first pair 60 of conductors 60a and 60b is shown having the switch terminals 52a, 52b. These conductors 60a, 60b can be seen in FIG. 3 as being electrically connected in the circuit 40 with the diode bridge 46 and with the switch prong 32b and second input 44b, respectively. The first pair 60 are disposed within an elongated sheath or jacket 82, as will be discussed below.

FIG. 4 also illustrates a second pair 70 of conductors 70a and 70b having the output terminals 50a, 50b. Accordingly, the conductors 70a and 70b are also illustrated in FIG. 3 as being downstream from the transformer 48 and, specifically, are the portion extending electrically downstream from the housing 34.

View FIGS. 1 and 3 and 4 together, the majority of the circuit 40 is disposed within the housing 34, including the circuitry 36 of the diode bridge 46 and the transformer 48. The prongs 32a, 32b extend from the housing 34 for connecting with a power source. The input from the switch prong 32b connects to conductor 60a and extends through an elongated sub-cable 64 to terminal 52b in the switch assembly 20. When the toggle 52 is in the closed position, the switch 42 electrically connects terminal 52b (and hence the switch prong 32b) with terminal 52a. Hence, the switch prong 32b is connected with the diode bridge 46.

The sub-cable 64 extends into and between the housing 34 and the switch assembly 20, and is provided with a companion sub-cable 74 for the conductors 70a and 70b. Specifically, each of the conductors 70a and 70b extends as shown in FIG. 3 from the circuitry 36 and through the sub-cable 74 in parallel with the sub-cable 64 and the conductors 60a, 60b. The conductors 70a and 70b terminate in the output terminals 50a, 50b providing the output power to the electrical device (not shown).

As shown, the charger C including the cable assembly 10 satisfy the safety standard that prevents an 'isolation' switch from being in a flexible cable. That is, because the switch assembly 20 cuts power at the input 44b/input prong 32b, the switch 40 acts as a functional switch with the plug (prongs 32 and housing 34) acting as the disconnect device. Additionally, the housing 34 and the circuitry 36 are generally maintained proximate to the power outlet, as is preferred by safety standards and users alike. Finally, the switch assembly 20 is allowed to be remote from the housing 34 so that it is proximate where users would actually connect and disconnect an electrical device to the charger C.

It is noted that the Underwriters Laboratories (UL) incorporates a National Electrical Code (NEC) standard known as ANSI/NFPA 70, including section 725.55 that essentially states primary (i.e., input AC powered) conductors and separated/safety extra-low voltage (SELV) conductors should not be in the same cable. The SELV conductors are, by definition, of sufficiently low voltage and amperage that a user may grasp the exposed 'hot' leads without risk of electric shock.

The preference for the primary and SELV conductors to be in separate cables is principally due to a concern of accidental connection between the primary and SELV which, in the case of someone touching the SELV leads, may allow a person to come into contact with line voltage (i.e., 120 VAC). It is for these exact reasons, among others, that the present cable assembly 10 and charger C are novel: not only do the standards organizations point to requiring switches (generally isolation switches) be co-located with the charger housing 34, the standards generally suggest that the primary conductors must be in a separate cable.

To address these issues, the cable assembly 10 not only presents a novel manner for providing the switch assembly 20 remote from the housing 34, but also provides the sub-cables 64 and 74 as the 'separate' cables. Turning to FIGS. 5A and 5B, embodiments of a cable 80 including sub-cables 64 and 74 are illustrated. The focus of the sub-cables 64, 74 within the cable 80 is, essentially, isolation, both physical and electrical. Each of the sub-cables 64, 74, as well as the cable 80 itself, is approximately 72 inches in length (between the housing 34 and the switch assembly 20).

The sub-cable 64 includes the primary conductors 60a, 60b, which may be formed of 26 AWG, as a pair of twisted wires within an insulation jacket 82a suitable for stand-alone use as a primary power cable. The sub-cable 74 includes the SELV conductors 70a, 70b, which may be formed of 22 AWG, as a pair of twisted wires within an insulation jacket 82b suitable for use with a SELV cable, though preferably the jacket 82b is also suitable as a primary power (i.e., direct AC power) cable jacket. It should be noted that each jacket and wire gauge, as described herein, should be selected for the particular usage of the charger C itself, among other parameters. It should be noted that the term "jacket" as used herein refers to an combination of insulation layer(s) around individual conductors/wires, common insulation around the pair of conductors/wires, and/or external layers encasing the conductors and insulation layer(s). At least between the SELV sub-cable 74 and the primary sub-cable 64, the isolation should be at least 3 kV, including within the switch assembly 20. In a preferred form, the primary sub-cable 64 includes a double insulation such as with Teflon or polyvinyl chloride (PVC), while the SELV sub-cable 74 may simply be a basic insulation such as PVC.

In FIG. 5A, the sub-cables 64 and 74 are then clad with a second overall jacket 86 to give the appearance of a single cable. Reliance is then had on the jackets 82a, 82b to sufficiently protect and isolate the conductors 60a, 60b, 70a, and 70b.

For FIG. 5B, the sub-cables 64 and 74 are offset from each other with a bridge 88. The bridge 88 is preferably substantially continuous between the jackets 82a and 82b along the length between the housing 34 (where the sub-cables 64, 74 are brought together) and the switch assembly 20 (where the sub-cables 64, 74 are split apart). The bridge 88 provides additional isolation and can be selectively sized for the offset.

Referring again to FIG. 4, the SELV conductors 70a, 70b (and preferably the entire SELV sub-cable 74) simply pass through the switch assembly 20. In the form of either FIG. 5A or 5B, the jacket 82b provides sufficient isolation so that it may be a unitary along its length up to a connector 100.

In greater detail, the output terminals 50a, 50b provide output power (e.g., 5 VDC) to an electronic device via a connector 100 that is preferably removably connectable with the electronic device. In the present form, the connector 100 is a mini USB connector, though any standard or non-standard connector style may be used.

Strain reliefs are provided on the cable assembly 10, as best seen in FIG. 2. A first strain relief 92 is provided where the cable 80 enters the switch assembly 20, a second strain relief 94 is provided where the SELV sub-cable 74 exits the switch assembly 20 (electrically downstream), and a third strain relief 96 is provided between the downstream SELV sub-cable 74 and the connector 100. The second and third strain reliefs 94 and 96 should be sized not to be in contact or otherwise be in physical interference. In a preferred form, the first strain relief 92 is 0.75 inches, the second strain relief is 0.5 inches, and the overall distance between the switch assembly 20 and the connector 100 is approximately 2.0 inches, as an example.

It should be noted that isolation is provided within the switch assembly 20 between the switch 42 and conductors 60a, 60b, and the SELV sub-cable 74. Essentially, if the SELV sub-cable 74 is provided with a jacket 82b that is sufficient for a primary, no more need be done between the primary conductors 60 and the SELV conductors 70. Alternatively or in addition, a barrier (not shown) may be placed within the switch assembly 20 therebetween or, preferably, surrounding the primary conductors 60 and being open only to accommodate the switch 42/toggle 52.

Figure 6:
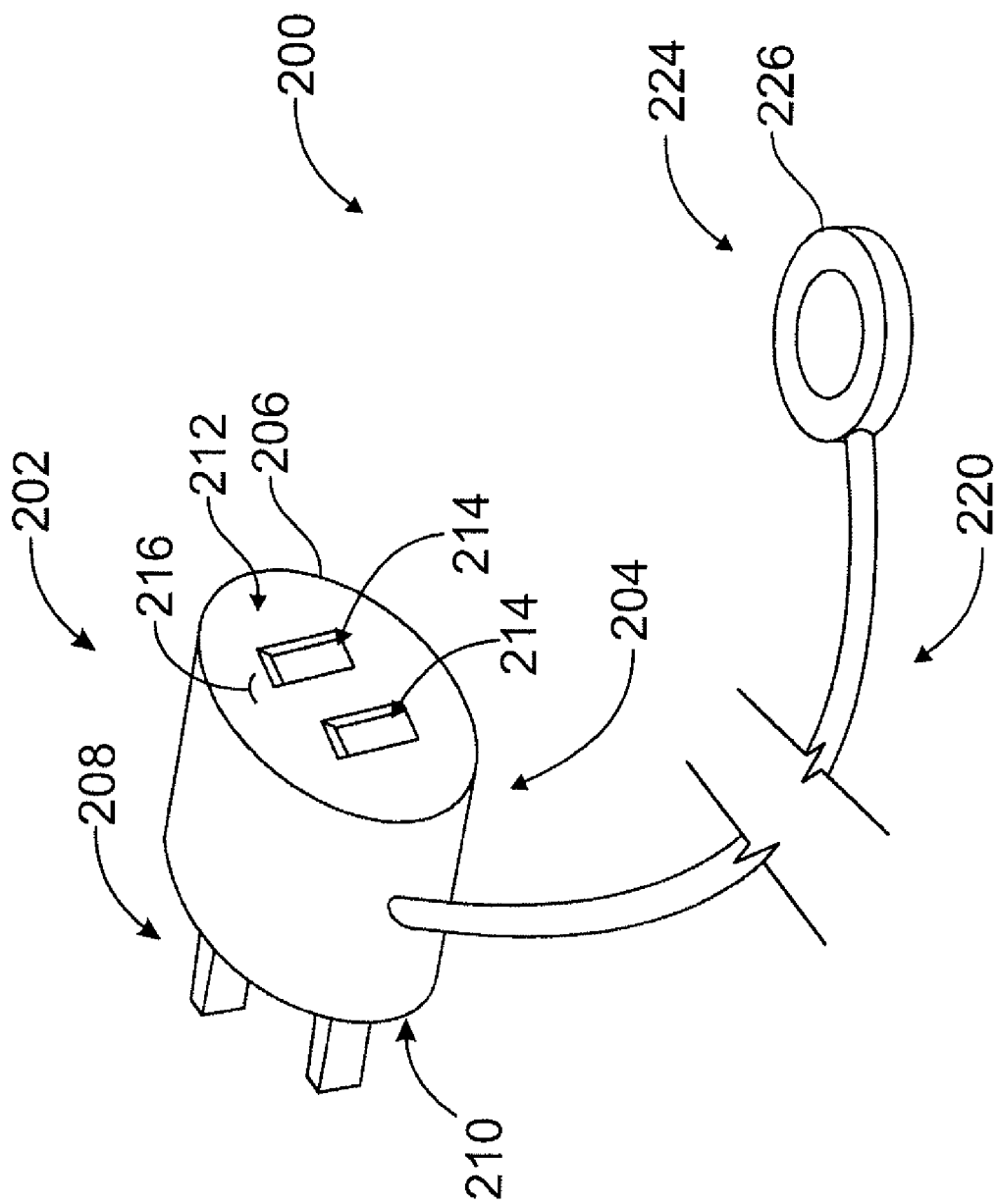
FIG. 6 is a form of a cable assembly of the present invention for use in conjunction with a primary power cable for an electrical device, the cable assembly being adapted to be connected to a power source at a first end, the first end having openings for receiving and electrically connecting with a plug of the electrical device, the cable assembly also having a cable extending from the first end to a second end with a switch disposed at the second end for connecting or disconnecting electrical power to the electrical device plug connected at the first end, the second end and switch be co-locatable with the electrical device.
Figure 7:
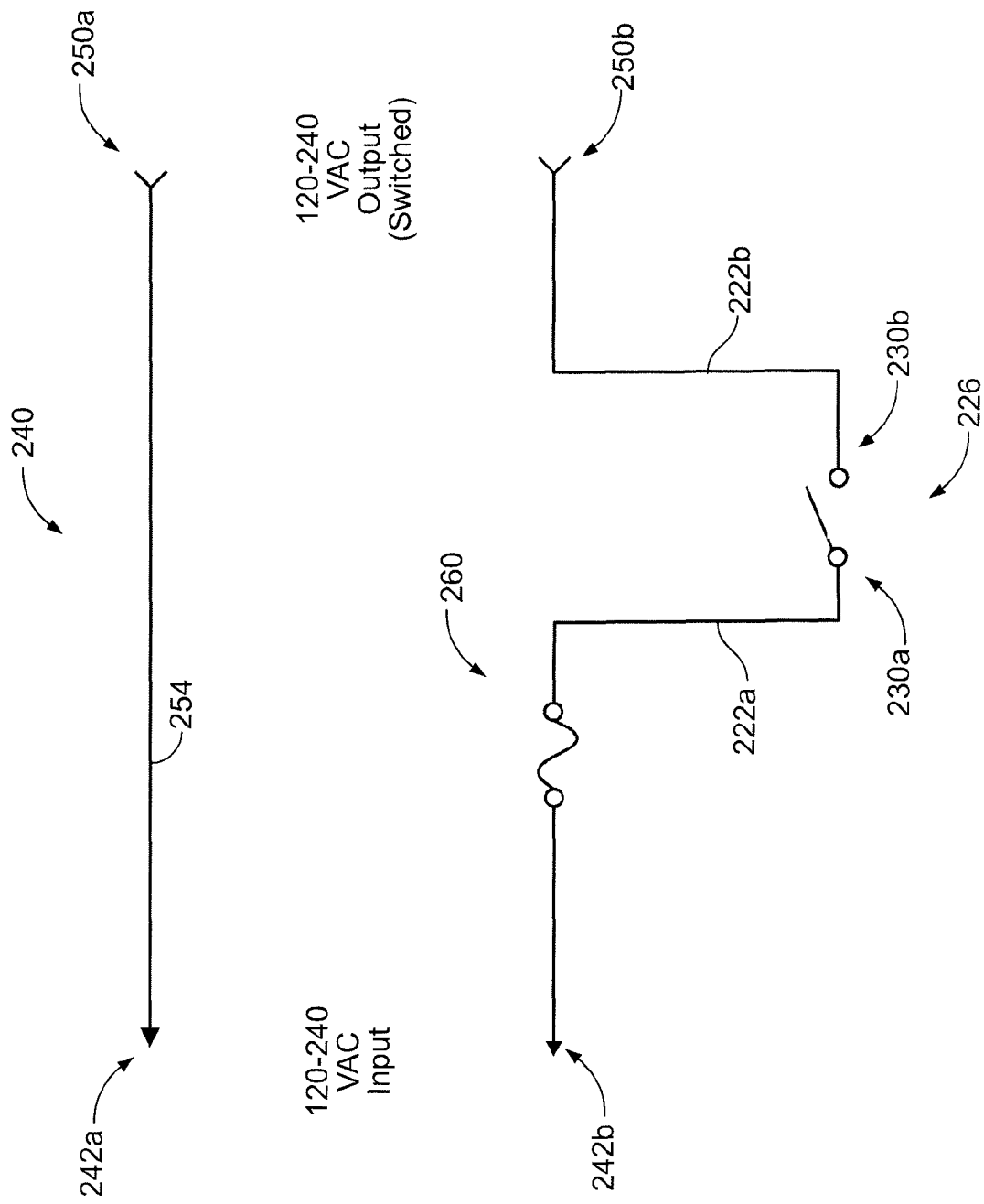
FIG. 7 is a first form of a circuit diagram for the cable assembly of FIG. 6.
Figure 8:
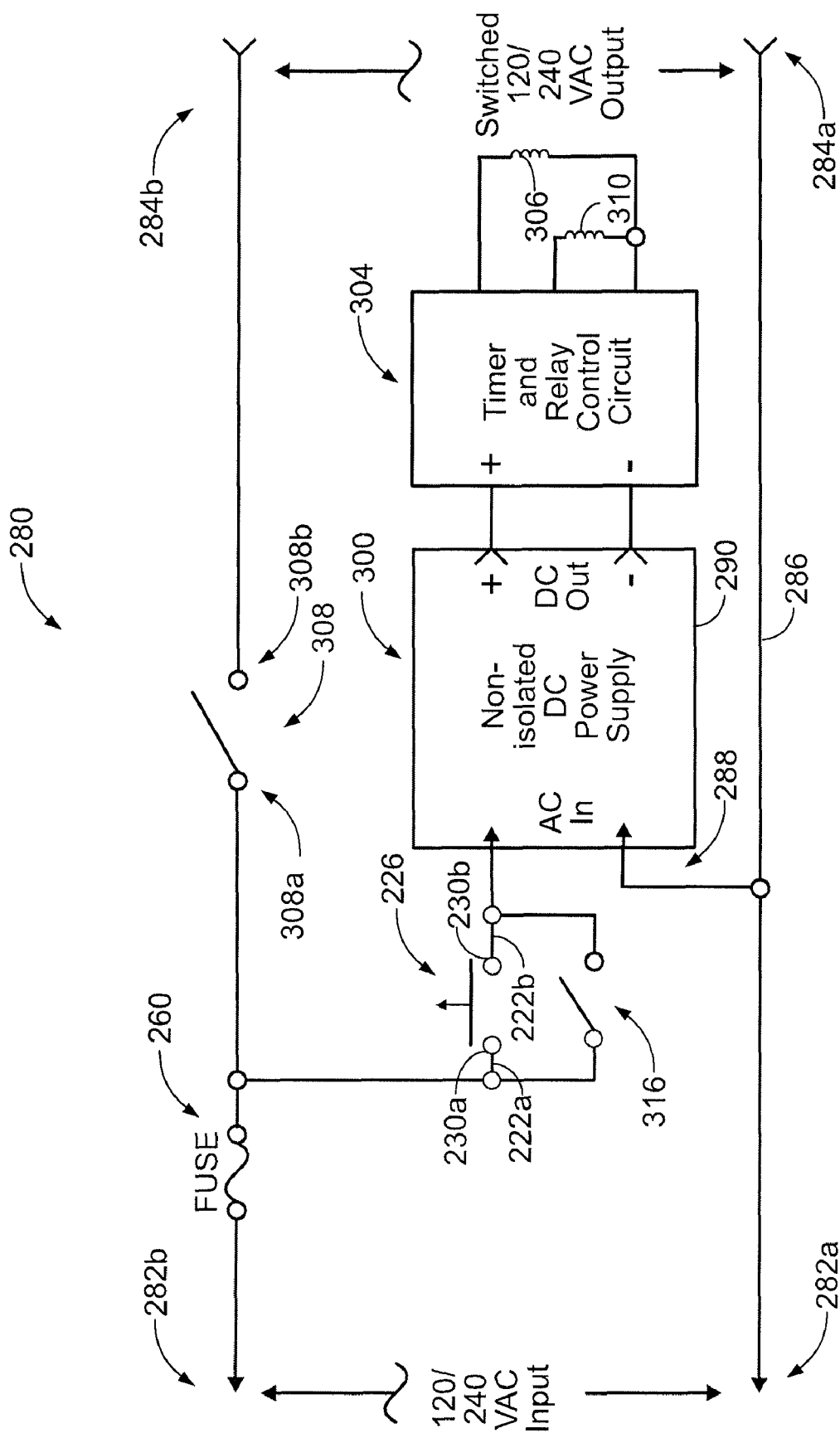
FIG. 8 is a second form of a circuit diagram for the cable assembly of FIG. 6.

Turning now to FIGS. 6-8, another form of the present invention is illustrated. While the previously-discussed and illustrated forms of the invention are generally directed towards a cable assembly that is a part of a power charger, as a single device, it is recognized that different electrical devices have different electrical requirements. Furthermore, it is also recognized that people may prefer to continue using the manufacturer-provided charger or that the manufacturer-provided power cord may not be removable from the device (i.e., the power cord is hardwired, such as for a VCR).

Accordingly, FIGS. 6-8 illustrate a cable assembly 200 for use with any power cable (not shown) for any electrical device (not shown). The cable assembly 200 has a first end 202 including a plug 204 having a plug body 206 with structure for connection with a power source in the form of prongs 208 extending from a first face 210. The plug body 206 has a second face 212, oriented opposite the first face 210, for electrical connection with the electrical device in the form of openings 214 forming a secondary power outlet 216.

When the electrical device is connected with the cable assembly 200, which is connected with the power source, the cable assembly 200 allows a user to connect or disconnect the power supply to the electrical device via the cable assembly 200. Towards this end, a cable 220 extends from the body 206 including a pair of wires 222a, 222b (see FIG. 7, e.g.) generally corresponding to wires 60a and 60b of the previous embodiments. The cable assembly 200 includes a second end 224 to which the cable 220 extends, the second end 224 including a user-activated switch 226 for connecting or disconnecting the wires 222a, 222b. In a variety of forms, the switch 226 may be a momentary-contact switch with a timed-shut off (including a push-button switch or a motion-activated switch such as a mercury switch), or, in the simplest form, the switch 226 may be a two-position switch such as a toggle or rocker switch, as is illustrated above as toggle member 52, each of the wires 222a, 222b having switch terminals 230a and 230b, respectively (the switch terminals 230a and 230b analogous to switch terminals 52a and 52b, discussed above).

Accordingly, the switch 226 of the cable assembly 200, when used with an electrical device, may be co-located with the electrical device. For instance, a cellular phone typically has a AC to DC power charger having a cable extending from a charger body, a DC connector for connecting with a power input to the cellular phone being at the end of the cable. A user may plug the phone charger into the cable assembly 200, and the charger connector may be co-located with the switch 226 so that the charger cable and cable assembly cable 220 run alongside each other. In some forms, additional components may be provided for holding the cables together. In some forms, the switch 226 or a portion of the cable assembly 200 proximate thereto may include a clip or other component for securing the switch 226 with the DC connector, as will readily be recognized.

Turning now to FIG. 7, a diagram of a first form of a circuit 240 is depicted for the cable assembly 200. As can be seen, the circuit 240 includes first and second inputs 242a and 242b corresponding to the prongs 208 and corresponding to "+" and "−" electrodes. The input rating for the circuit 240 is, in the present form, 120-240 volts AC as is known in the art, though this may be different such as for countries other than the United States. The circuit 240 includes first and second outputs 250a and 250b corresponding to the openings 214 and secondary power outlet 216 for electrical connection with the plug (not shown) of the electrical device cord or charger or the like.

As can be seen, the inputs 242a and 242b are electrically connected or connectable to the outputs 250a and 250b, respectively. The input 242a is directly wired to output 250a via wire 254; however, the input 242b is connected to wire 222a having switch terminal 230a, while output 250b is connected to wire 222b having switch terminal 230b. Accordingly, the switch 226 may be used to connect or disconnect switch terminal 230a with switch terminal 230b and, hence, to connect input 242b with output 250b. It should be noted that a power-limiting device in the form of a fuse 260 is provided in-line with the switch 226.

Turning now to FIG. 8, a diagram of a second form of a circuit 280 for the cable assembly 200 is depicted. Like circuit 240, a pair of inputs 282a and 282b are provided corresponding to the prongs 208, and a pair of outputs 284a and 284b are provided corresponding to openings 214 and secondary power outlet 216 for electrical connection with the plug of the electrical device cord or charger or the like. The input 282a is directly connected to output 284a via wire 286, as well as directly connected to an input 288 of a non-isolated DC power supply 290 (including a transformer, as will be recognized).

The circuit 280 includes a representative form for allowing momentary contact or activation of the switch 226 by the user to connect the power from the power source to the secondary power outlet 216 and the electrical device connected thereto. The input 282b is connectable to the output 284b across the switch 226. Again, it should be noted that the wires 222a and 222b include the switch terminals 230a and 230b and extend through the cable 220 for connection/disconnection via the switch 226. Within the cable assembly plug body 206 is a sub-circuit 300 that is activated by the switch 226.

The sub-circuit 300 includes the input 288 and a second input 302 so that, upon momentary connection via the switch 226, the power supply 290 receives input AC power. The power supply 290 provides output DC power to a control 304 including a timer and relay circuit. Upon connection and activation of the power supply 290 and the control 304, a power-on relay coil, referred to herein for simplicity as the on-coil 306, physically shifts a relay contact 308 to a closed position across contact terminals 308a and 308b thereof. In the closed position, the relay contact 308 connects the input 282b with the output 284b, thus providing electrical power to an electrical device connected at the secondary power outlet 216.

The timer of the control 304 is also activated by the at least momentary connection of the switch 226. After a predetermined time, the timer serves to notify the control 304 to activate a power-off relay coil, referred to herein for simplicity as the off coil 310, which physically shifts the relay contact 308 to an open position, as is illustrated in FIG. 8. It should be noted that a secondary relay 316 is provided and is opened and closed in a manner corresponding to the position of the relay contact 308 so that, while the relay contact 308 is in the closed position, the relay 316 provides power to the power supply 290 and the control 304. In some forms, the relay contact 308 and relay 316 may be combined, as will be readily recognized. In simple forms, the predetermined time for the time may be selected as a manufacturing or programming step corresponding to a designated use for the cable assembly 200, while in more complex forms the predetermined time may be programmed or selected by a user depending on a desired application of the cable assembly 200.

Figure 9:
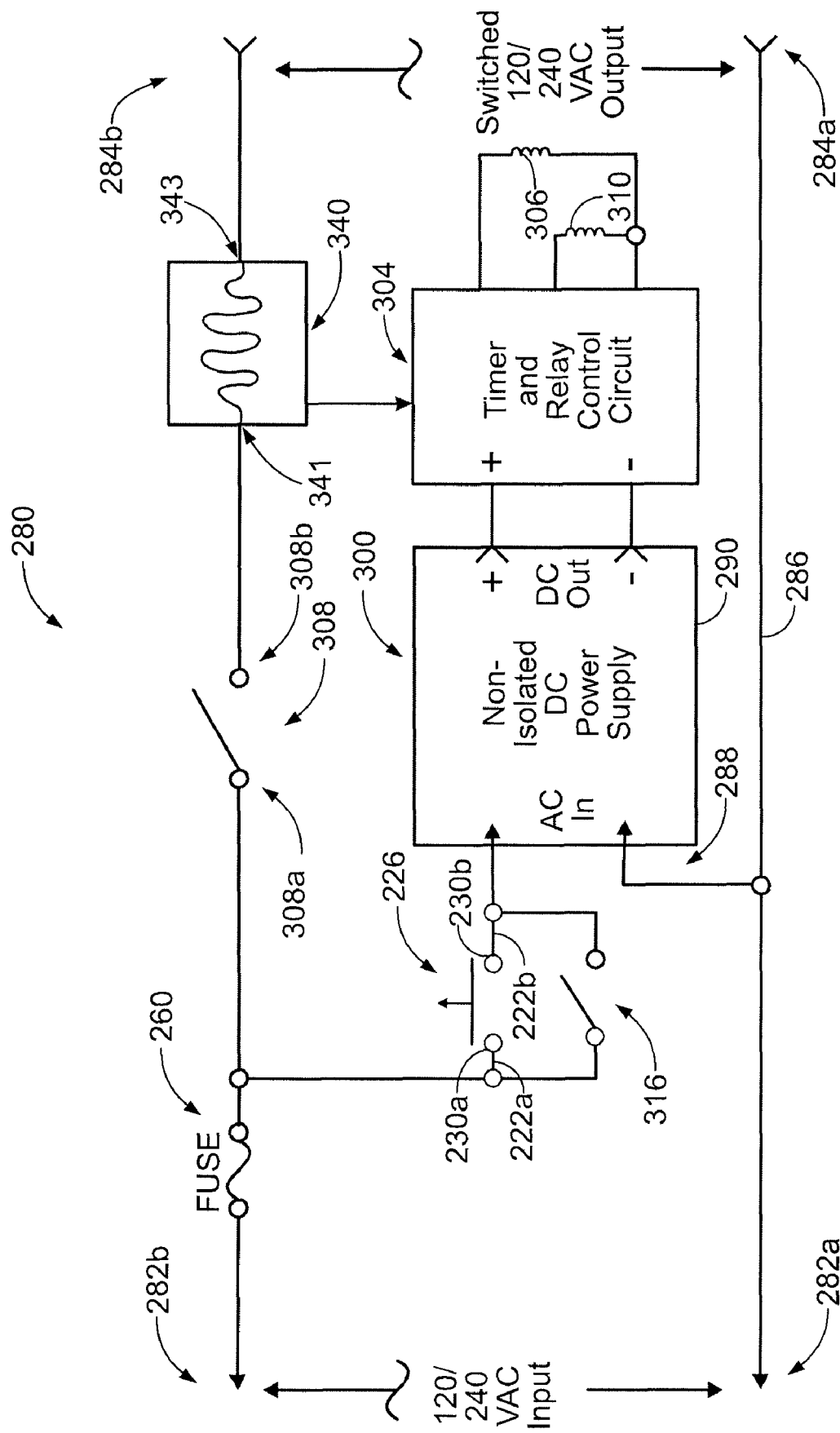
FIG. 9 is an additional form of the circuit diagram of FIG. 8.

In a form of the circuit 280 shown in FIG. 9, the circuit 280 is adapted to additionally or alternatively sense a level of current through an output and automatically shut off when the current drops below a predetermined level. As can be seen, a current sense element 340 is provided across points 341 and 343, in which case there is no connection between points 341 and 343 other than through the current sense element 340. Preferably, the current sense element 340 is connected with the control 304 so that the circuit 280 is shut off in the same manner as described above by the off coil 310 opening the relay 308.

In one preferred embodiment, the control 304 ignores a low current level from the current sense element 340 for a predetermined period of time. It is not uncommon for batteries, at the beginning of a charge cycle, to draw a low amperage current. By providing an initial period of time from the push button starting of switch 226 in which a low current through the current sense element 340 is ignored, the circuit 280 remains closed until for a sufficient period to allow the current to rise. Otherwise, the low current may cause the current sense element 340 to provide an indication to the control 304 to open the circuit 280 via the off coil 310.

While in some forms a current threshold (below which the circuit 280 is shut down) is predetermined, the threshold may also be adjustable. For instance, a switch or knob is provided that may be used to select a current level, this selection being made prior to connection with the electronic device such as a cell phone and its charger. Alternatively, the circuit 280 may be adapted to sample current to the electronic device when in the idle state, and internally storing a setpoint (such as storing a setpoint as a threshold in the control 304).

It should be noted that, while it is preferred to use the above described timer feature in conjunction with the current sensing feature, either could be used separately and independently of the other. In greater detail, the timer feature of circuit 280 as illustrated in FIG. 9 may be simplified by eliminating a requirement that the circuit 280 open after a predetermined period of time, instead relying on the current sense element 340 alone. Additionally, in some forms, the initial period during which a low current is ignored would not be necessary.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

What is claimed is:

1. A cable assembly for use with an electrical device, the cable assembly including:
   a first portion for connection with and receipt of input power from a power source;
   a second portion including a user-actuated switch;

a cable extending between the first and second portions;
a third portion for electrical connection with and for providing output power to the electrical device, wherein the switch is operable for at least connection of the output power; and
circuitry operable to automatically disconnect power in the cable assembly when current to the electrical device falls below a threshold level.

2. The cable assembly of claim 1 wherein the first portion includes a plug having a plug body and a first and second side, the first side having prongs for electrical connection with the power source in the form of a power outlet, the second side having a secondary power outlet for receiving prongs of the electrical device for delivering electrical power thereto.

3. The cable assembly of claim 2 wherein the switch may be secured with a portion of the electrical device.

4. The cable assembly of claim 3 wherein the electrical device includes a power cord including a connector for removable connection to and from the electrical device, and wherein the switch may be secured to the connector.

5. The cable assembly of claim 1 wherein the switch is a two-position user-actuated switch.

6. The cable assembly of claim 1 wherein the switch is user-actuated by a momentary connection across switch terminals thereof.

7. The cable assembly of claim 6 further including a timer, wherein actuation of the switch allows power to be provided to the third portion for a predetermined time, and the timer effects disconnection of the power after the predetermined time.

8. The cable assembly of claim 7 further including a current sense element for sensing the current to the electrical device.

9. The cable assembly of claim 8 wherein a predetermined delay period is provided, wherein the power in the cable assembly remains connected for the delay period subsequent to actuation of the switch.

10. The cable assembly of claim 6 further including a current sense element for sensing the current to the electrical device.

11. The cable assembly of claim 1, wherein the threshold level is predetermined.

12. The cable assembly of claim 1, wherein the threshold level is adjustable.

13. The cable assembly of claim 1, wherein the circuitry is operable to sample current to the electrical device in order to determine the threshold level.

14. The cable assembly of claim 13, wherein the circuitry is operable to sample current to the electrical device when the electrical device is in an idle state in order to determine the threshold level.

15. A cable assembly for supplying output power to an electronic device, comprising:
a first portion for connection with and receipt of input power from a power source, the first portion including a housing and electrical circuitry housed therein;
a second portion including a switch;
a cable extending between the first and second portions, the cable including:
a first sub-cable including:
a pair of switch wires electrically connectable via the switch;
a second sub-cable including:
a pair of output wires, each of the wires connected with output power from the power device, and each of the output wires electrically connected with a connector for transmitting output power to the electronic device,
wherein the switch is operable to close the electrical circuitry, the electrical circuitry drawing substantially no power when open.

16. The cable assembly of claim 15 wherein the first and second sub-cables are encased by a single jacket.

17. The cable assembly of claim 15 wherein the first and second sub-cables are joined by a bridge.

18. The cable assembly of claim 15 wherein the switch disconnects power from an input terminal of the first portion.

19. The cable assembly of claim 18 wherein the switch disconnects the input terminal in the form of a plug prong of the first portion from the electrical circuitry.

20. The cable assembly of claim 15 wherein the first and second sub-cables are joined substantially in parallel to extend a length from the housing of the first portion in which the electrical circuitry is disposed to the second portion including the switch.

21. The cable assembly of claim 20 wherein the second sub-cable extends from the second portion to the connector.

22. The cable assembly of claim 20 wherein the output wires extend from the second portion to the connector.

23. The cable assembly of claim 15 wherein the switch is a functional switch.

24. The cable assembly of claim 15 wherein the switch is remotely located from the electrical circuitry.

25. The cable assembly of claim 15 wherein the first portion is a step down AC to DC converter, and the switch cuts input AC power to the electrical circuitry.

26. The cable assembly of claim 15 wherein the switch is moveable between first and second positions corresponding to open and closed states of the electrically circuitry.

27. The cable assembly of claim 15 wherein the cable assembly is elongated and flexible, the first portion includes input prongs for receiving input power from a power source, and the switch is located remotely from the housing.

28. A power device for use with an electrical device, the power device including:
an input for connection with and receipt of input power from a power source;
an output for electrical connection with and for providing output power to the electrical device, wherein a switch is operable for at least connection of the output power; and
circuitry operable to automatically de-power at least a portion of the power device when current to the electrical device falls below a threshold level, wherein the circuitry initially ignores current to the electrical device below the threshold level for an initial startup period, while the power device is coupled with the electrical device.

29. The power device of claim 28, where the current to the electrical device is for charging a battery thereof, and wherein a duration of the initial startup period is sufficiently long to permit the current charging the battery to rise above the threshold level.

30. The power device of claim 28, wherein the circuitry is operable to sample current to the electrical device in order to determine the threshold level.

31. The power device of claim 30, wherein the circuitry is operable to sample current to the electrical device when the electrical device is in an idle state in order to determine the threshold level.

* * * * *